March 11, 1969 AL I. BESSONNY ETAL 3,432,672

PHOTOELECTRIC WEB REGISTRATION CONTROL INCLUDING TWO PHOTOCELLS WHICH GENERATE OPPOSITE POLARITY SIGNALS THAT TERMINATE SIMULTANEOUSLY

Filed March 4, 1965

INVENTORS.
AL I. BESSONNY
HOWARD BOWEN

BY Watson D. Harbaugh

ATT'Y.

INVENTORS.
AL I. BESSONNY
HOWARD BOWEN
BY Watson D. Harbaugh
ATT'Y.

3,432,672

PHOTOELECTRIC WEB REGISTRATION CONTROL INCLUDING TWO PHOTOCELLS WHICH GENERATE OPPOSITE POLARITY SIGNALS THAT TERMINATE SIMULTANEOUSLY

Al I. Bessonny and Howard Bowen, Evanston, Ill., assignors to Machine-O-Matic, Inc., Evanston, Ill., a corporation of Illinois Filed Mar. 4, 1965, Ser. No. 437,063
U.S. Cl. 250—219 10 Claims
Int. Cl. G01n *21/30;* H01j *39/12*

ABSTRACT OF THE DISCLOSURE

The specification describes an automatic web registration control for use with printing presses and the like which require precision regulation through mutiple processes of the elastic web containing gauging indicia. The illustrated embodiment comprises a pair of photocells spaced apart by the normal distance between a pair of indicia and a pair of pulse generation circuits for generating a pair of pulses of opposite polarity, one for each of the photocells, each initiated when its respective photocell responds to a gauging mark. The control also contains a timer initiated by the first generated pulse which simultaneously terminates both pulses. If the web is out of registration, the durations of the pulses will be different and this is detected by adding them. The output pulse will have the polarity of the longer of the pair of pulses and its duration will be a function of the magnitude of the loss of registration. The output pulse is then transmitted to the web tension rollers, humidifiers and driers to control web length and registration. Modifications are also suggested.

The present invention relates to the monitoring and control of the stretch and shrink of a preformed web of a variable stretch material for maintaining proper registration of the web in conversion operations successively performed on the web.

The present invention includes folder and collator converters but is illustrated by way of example, in connection with the progressive conversion of a continuous running web such as paper or plastic in a web-fed rotary type printing press in which any elongation or contraction of the web in whole or in part may create a problem or be desired and is representative of coating, humidifying drying and other similar processing machines. It is applicable particularly where the proper registration of the web is desired for a final operation or in the superposition of a series of repeat operations on a previously performed series of repeat operations on the web. The particular embodiment described herein involves the registration of a subsequent print upon a previous one in a multicolor process along with driers and humidifiers.

Stretch or shrinkage in the web is a very important consideration for the registration on the web. Whether the web is new or previously processed, an elongation or contraction can occur as it passes from a supply roll through a single or multi-stage conversion whether it ends either in a cutting for collation or in a roll-to-roll rewind for further conversion later.

Heretofore, a sample section of the web has had to be isolated from the web and actually measured by rule within fractions of an inch over a length great enough to cover many repeats. This involves appreciable waste of time and material. Registration of successively superposed bench marks of successive operations has also been used for visual observation for discrepancies, but both involve the making of manual adjustments for stretch or shink and then rechecked in order to provide an end product that could be acceptable even within wide tolerances.

The present invention, although described in connection with a cylinder type printing press handling a paper or plastic web at high speeds such as 15 to 20 feet a second, may be used continuously to quickly monitor and control the tension on any appreciably resilient or yieldable material that is undergoing mutiple handling and thereby maintain a lineal constant within less than a couple thousandths of an inch per twenty lineal feet.

In doing this the web is provided at the first opportunity with a succession of indicia of a predetermined exact spacing which indicia may be separate from or a part of a conversion step to serve as bench marks for the registry of subsequent operations on the web. Each mark can be a printed line, a perforation or an embossment which ever is compatible or a part of the primary operation. Preferably, the marking is done at the first critical step after which, or because of which, the web will tend to contract or elongate. Although the indicia marks, when applied, are identically spaced, the distance between them may be any appreciable distance, small or large. Printed lines or perforations are generally the most convenient forms of indicia and with these photoelectric devices are preferably used. They are effectively spaced from each other said predetermined distance to scan and respond to said marks as they move with the web as permanent reference points to subsequent operations.

Photoelectric reaction to a passing mark is a response of several micro seconds duration and provides an electrical current change or pulse. The pulse responses of each photoelectric cell separately actuate independent circuits in each of which an output current pattern is monmentarily changed. Preferably the current pattern for each circuit is one of a continuing non-flow type under resting and alert conditions and this is changed to a momentary flow of current by each pulse regardless of simultaneity of pulses or their order of actuation. However, the current changes induced are coterminus at one end of their duration each and every time.

The period of each current change in each circuit is preferably increased in duration beyond the pulse life by a timer and both are matched against each other each time. Preferably the two currents are of opposite polarity and when the currents flow simultaneously they in effect cancel each other as an end result with respect to a galvanometer type meter. But if the current flows are not coextensive as where they are not started simultaneously the one strated first will not be cancelled as far as the meter is concerned until the other current flow is started thereby providing a momentary current flow differential whose duration constitutes an indication of the presence and degree of the discrepency variation that is present in the actual spacing of the scanned marks on the web from their original bench mark spacing or the spacing of the photoelectric scanners. This indication is an index to any elongation or contraction present in the web that would affect registration.

The marks can be spaced a distance as small as ½″ but preferably range from 6″ to 24″, generally around 10″ and at press speeds of 15 to 20 feet per second, the increments of uncancelled current occur with sufficient rapidity to provide a pulsing DC current which is registered as a continuous current by the meter for all measuring purposes. Thereby any amount of monitoring current selected above a predetermined measurement can be translated to correct and even over correct the length of the web accordingly to restore and maintain registration.

If the upstream photocell is the first to be actuated, the current flow is related to a contracted web condition but if the downstream photocell is actuated first the current flow is related to an elongated web condition. If the web is contracted the web length is increased through a suitable means that is located ahead of the photocells and includes an increase in stretch tension or an application of moisture, or both, and if the web is elongated the stretch tension is lessened, or heat is applied, or both.

One of the objects of the invention is to maintain registration of superposed operations on a web including varying the stretch of the web during or after the initial operation thereon.

Another object of the invention is to continuously monitor the stretch of a web progressively along its length as it is being successively converted at different stations with operations that affect its length.

The invention is characterized by an instant rapidly repeating continuous monitoring response to the stretch condition of a web for subsequent operations whose desired or work length was determined and accurately marked off or controlled in a primary operation.

A further object of the invention is to provide a rapidly responsive web stretch control for a rapidly moving web which is monitored and preceded by a series of micro second checks recurring with a rapidity that provides a current of pulsating direct current for recording and control by polarized current responsive devices.

Another object of the invention is to provide a stretch measuring device for a running web which provides a pulsating DC current in which the length of the pulses vary in relationship to changes in the length of premeasured portions of the web.

Another object of the invention is to gradually correct for a measured length discrepancy in a web with a controllable average response signal based on a plurality of completed contiguous measurement responses to provide an average response which correction can be varied infinitely within the capacity and needs of the system including over conditioning the web fora time that is necessary to reestablish registration or merely restore the web condition and maintain length and synchronism.

Another object of the invention is to provide an instantly effective web length monitoring, measuring and control device having repeat responses to provide a pulsing electrical current in which the length of each pulse provides and varies the flow of electrical current to a work control device which operates with one web handling machine for any purpose or with a plurality of machines whose outputs are to be collated.

Another object of the invention is to provide a length measuring arrangement that is continuously responsive with sufficient frequency to provide a DC pulsating current that operates a galvanometer with an adequately steady indication which varies its response amplitude with the length of the pulses and reverses its position with respect to a change in the polarity of the pulses.

Another object of the invention is to provide a running web stretch indicator and registration control system based upon the progressive average of a plurality of contiguously successive measurement checks that are effective without accumulation of discrepancies and are independent of any variations in the speed of the web to provide a stretch monitor and control that is adequately constant in its response pattern irrespective of the distance determined between indicia serving as bench marks.

A further object is to provide a mechanism and process of the class described which is easily used and serviced and is simple to understand and operate to provide micro-inch accuracy without shtudown time or waste of web material in web processing work.

These being among the objects of the invention other and further objects will become apparent from the description and drawings herein in which.

Figures 2, 3A, 3B:
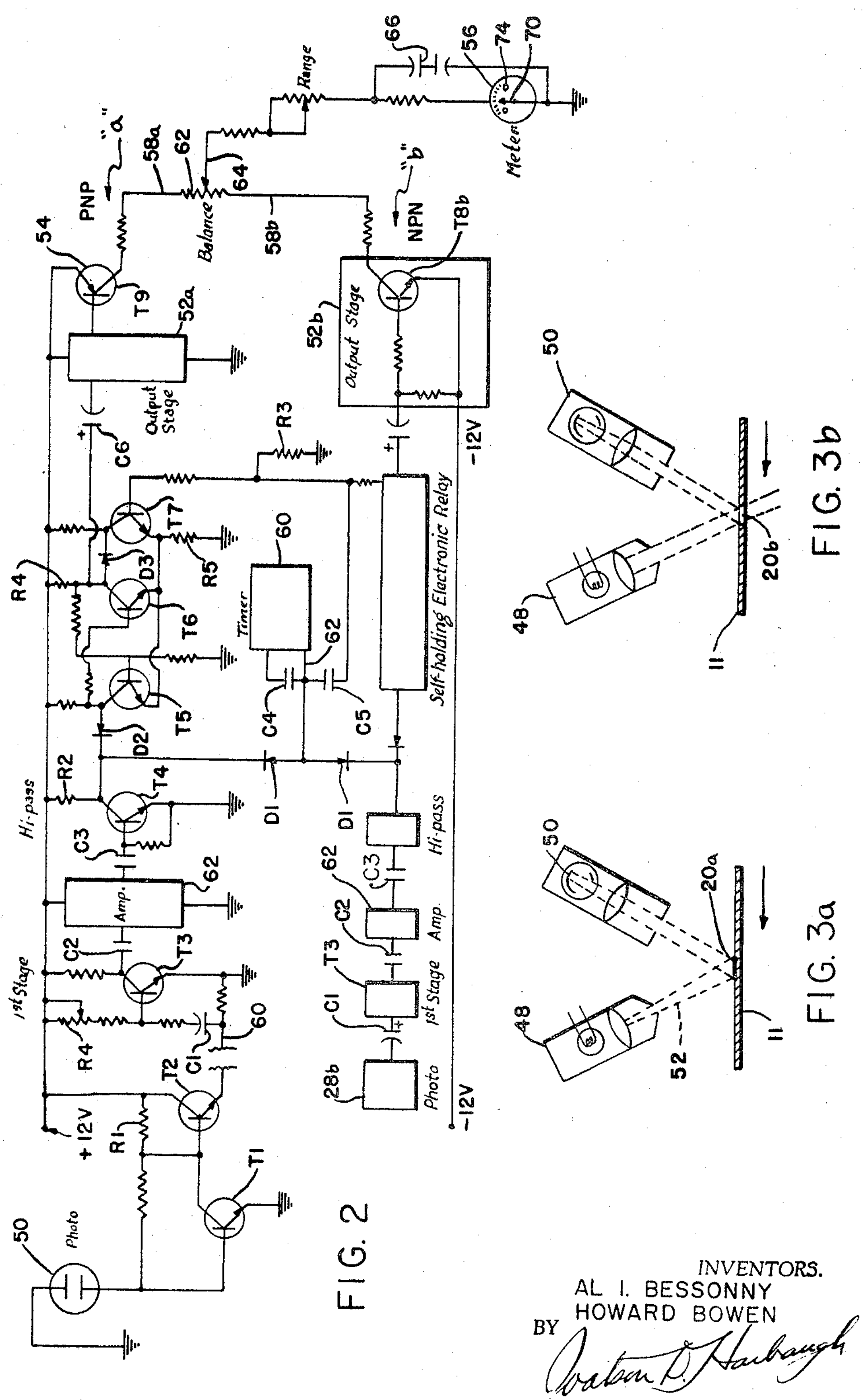
FIG. 2 is a digrammatical view of the web stretch and registration monitor and control device embodying the invention.

FIGS. 3*a* and 3*b* are enlarged side elevational views of the light source, photoelectric pick-up arrangement with several types of bench marks upon the traveling web.

Referring now to the drawings in further detail, although a web-fed rotary press can print multiple colors on both sides of the web the press illustrated is shown as a single side press 10 for purposes of simplicity. Furthermore, the printed web 11 employed is shown as paper, cellophane or plastic with the output delivery 8 to a cut-off shear, a signature folding device, a collator for the outputs of several presses, or for rewind (not shown), where the printed web as in flexography may be used later as a product wrapper or for further processing.

Figure 1:
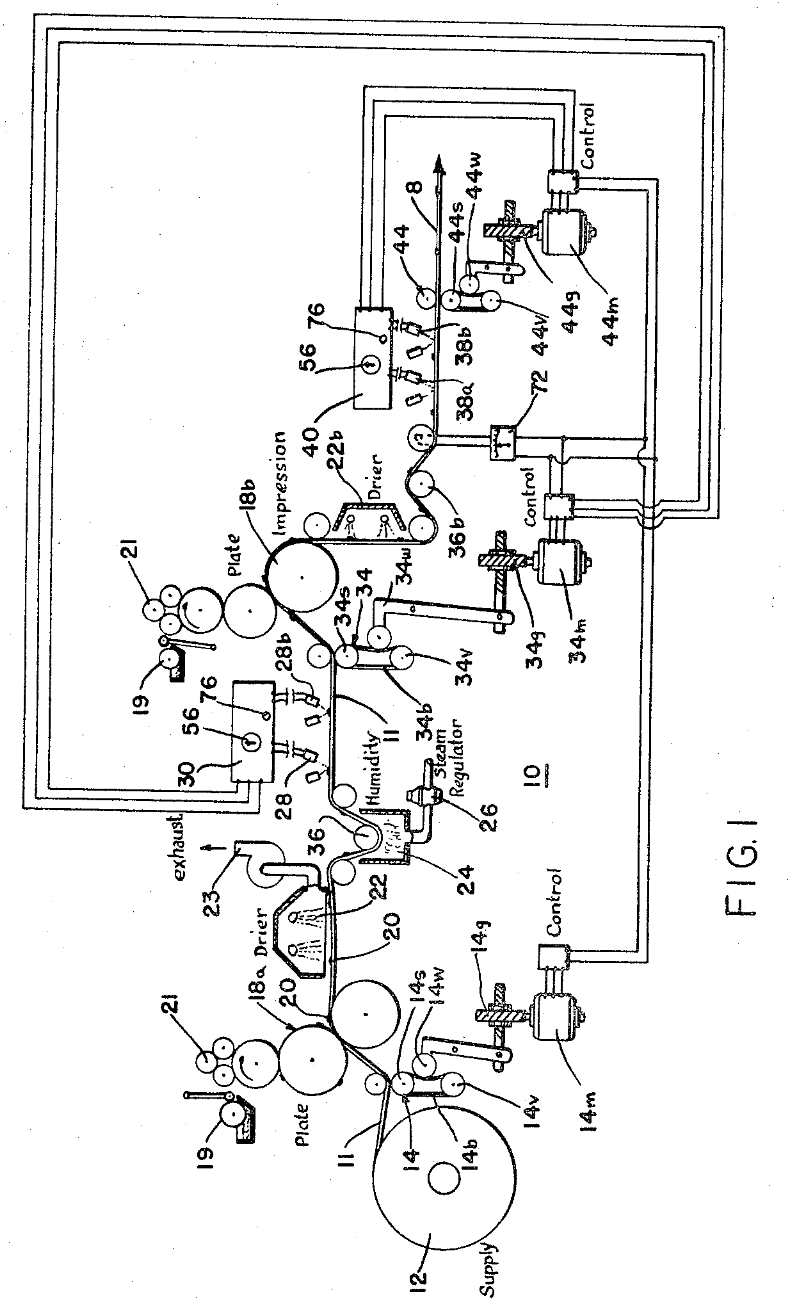
FIG. 1 is a diagrammatical side elevation of a multicolor roll-feed web-press constructed suitably for illustrating the invention described herein, same being representative of planographic (water fount omitted) or relief presses.

In FIG. 1 a continuous web 11 of paper is fed from a supply roll 12 through intergeared metering rollers 14 which apply a mild adjustable brake upon the web to provide a working tension on the web. The brake includes a V-belt pulley 14*v* geared to the printing rollers which drives the rollers 14 through a V-belt 14*b* whose tension is controlled by a lag wheel 14*w* advanced and retracted through a gear reduction 14*g* by a reversing DC drive motor 14*m*. The driven pulley 14*s* on the metering roller is a split sheave which reduces its effective radius under increased tension on belt 14*b* and vice versa.

From the metering rollers 14 the web passes between printing rollers 18*a* that apply three spaced indicia or bench marks 20 marginally on the web each revolution. The marks coming off of the first printing rollers are identically spaced to provide a continuous series of marks related to an initial or working stretch of the web and to the registration of subsequent imprints to be applied to the web. Ink is supplied from an ink fount 19 through distribution rollers 21.

The web then passes through a heated ink drier 22 in which the volatiles of the ink and some of the moisture in the web are removed by evaporation and then exhausted safely to atmosphere through the blower 23. The normal moisture content of the paper is 6–8% and the drier in removing some operates to contract the web. This decreases the distance between successive bench marks 20 beyond the drier.

Immediately following the drier the web passes through a variable humidity steam chamber 24 supplied with steam from a steam line controlled by a regulator 26. Thereafter the bench marks 20 are carried past two spaced photoelectric scanners 28*a* and 28*b* which actuate the monitoring and control circuits indicated by box 30.

The photoelectric scanners are preferably located each occasion just ahead of a web stretching device and the next critical registration step for the web which as shown is another printing station with printing rollers 18*b*. Associated with the scanners 28*a* and 28*b* is the stretching device comprising stretch control rollers 34 that assure proper paper stretch and registration of the printing rollers as a continuing factor. The stretch control rollers 34 are similar to the metering rollers 14 previously described and are similarly controlled by a split sheave 34*s*, lag pulley 34*w* and geared reversing motor control 34*m* and 34*g*. These rollers serve as a second set of metering rollers and not only "meter" the web to the second printing but can either drag on the web to permit the contraction thereof or as controlled can overrun the printing rollers 18*a* to stretch the web ahead of themselves. A third set of metering rollers as at 44 beyond the second printing then adjust accordingly and in a similar manner as controlled by a second scanner 40. Although the metering rollers may be located ahead of the scanners, they are shown just beyond the scanners where the scanners can detect and control the work of the stretch control rollers that are effective upon the respective portion of the web being scanned.

In brief, between the two sets of metering rollers such as rollers 14 and 34, and just ahead of the next critical step in processing the web, the web carries the bench marks 20 under the scanners comprising two photo electric devices 28*a* and 28*b* which are spaced effectively the exact distance decided upon or originally provided between the bench marks in the first printing operation. If there has been elongation, photoelectric device 28*b* will be actuated first and if there is contraction, the photoelectric device 28*a* will be actuated first. The time difference between their actuation in either case will determine the degree of length discrepancy in the web and this discrepancy can be translated into the length of electrical pulses of a pulsing DC current with a distinguishing polarity indicating the order of precession, which factors are ultimately utilized to control the humidity regulator 26 and the reversing motor 34*m* appropriately to correct the discrepancy. Advancing the lag pulley 34*w* will increase the stretch effort and elongate the web. This operation is shown independently of the maintenance of the proper running tension and phasing of the web as controlled through on adjustably fixed lag roller 36.

If there are further process steps that are critical regarding the point of registration, the scanner and stretch control assembly can be repeated as often as needed, see scanners 38*a* and 38*b*, control box 40, and stretch control rollers 44 and associated elements identified by like suffix letters. From the control of the last scanner and rollers (see 44) the web passes to a cut-off, collator, folder or a rewind roller for later conversion.

Referring now to the scanning operation and FIGS. 3*a* and 3*b*, the light source 48 supplied with DC current of constant voltage regulation is located on the same side of the web as the photoelectric cell 50 and the beam of light 52 is an intensified one directed at an angle to the web in the path of passing bench marks 20 with suitable lensing provided for sensitivity and minimum stray interferences. The bench marks may be dark lines as at 20*a* or perforations 20*b*. In either case, a drop in light reflection to the photocell when either passes through the beam, momentarily lowers the conductivity of the cell and thereby provides a signal pulse.

The photoelectric cells 50 separately control parallel circuits (suffixes *a* and *b*, FIG. 2) which circuits are substantially the same up to the final current output stages 52 where one of the circuits *a* is provided with a current polarity inverting PNP transistor 54. A meter 56 bridges the outputs 58*a* and 58*b* of the two circuits. Under resting and alert conditions no current flows at the current outputs. Actuation of the photocells induces the flow of currents of opposite polarity to the meter, but if the photocells are actuated simultaneously, the current flow is also induced in both simultaneously and the two currents in effect cancel each other and the meter remains unaffected. The flow is continued by a timer 60 which simultaneously stops the flow of both circuits preferably before the next scanning response occurs. The meter is not affected by the simultaneous restoration of the circuits to their alert condition.

In event one photocell is actuated before the other by the bench marks, the one current will be induced and the other current will remain absent until its photocell is actuated. The flow of current by only one photocell will appropriately be recorded by the meter for elongation control of the web.

In accomplishing this, reference is made to FIG. 2 in which circuit portions are shown in detail in one of the *a* circuits where they are significant and identical and in both where they are different. Box diagrams are otherwise used in the *b* circuit where identical.

The photoelectric cell 50 conducts under illumination and controls an amplifier transistor T1 and an emitter follower T2 which is normally positive conducting to enable the use of long leads to the control box 30. With the photoelectric cell 50 conducting steadily, it diverts some of the base current from the transistor T1 resulting in a reduced flow of current in the transistor T1. This in turn increases the forward bias on the base of T2 causing it to conduct as long as cell 50 is conducting steadily. Interruption of light to the photoelectric cell curtails current flow therethrough and increases the positive potential of the base of transistor T1 rendering it additionally conducting and this decreases the positive potential at the base of transistor T2 to drop or change its conduction with a sharp effect. This sharp current change pulses the electrolytic coupling capacitor C1 and provides a voltage pulse or potential drop on the base of normally conducting transistor T3 which renders it non-conducting and thereby develops a positive pulse to the amplifier section 62 fed by the capacitor C2. A positive pulse output of the amplifier is transmitted by a high pass filter capacitor C3 of .005 mfd. to apply a sharp pulse of one microsecond to the base of the non-conducting transistor T4 for amplification which then results in the delivery of a negative pulse at the collector thereof. During resting condition the transistors T4 of both circuits are non-conducting and the potential on its collector is positive through resistor R2. Diodes D1 and D2 are connected to the collector of transistor T4 and are oriented to block flow of positive current therefrom.

The other ends of the diodes D1 of both circuits are connected in common to the input-output 62 of a timer 60 and through capacitor C5 back to the respective bases of transistors T7 further described later. The other end of each diode D2 is connected separately to the collectors of transistors T5 in the respective circuits. Then when transistor T4 is pulsed to be conductive its collector will flow through the diodes connected thereto and therewith provide a negative pulse.

The timer 60 receives this negative pulse from diode D1 and the bases of transistors T7. The timer 60 responds to the microsecond pulse and delivers back many microseconds later a positive pulse through capacitor C5 to the base of transistor T7.

The negative pulse induced through diode D2 is effective upon the base of the normally conducting transistor T6 which then blocks current therethrough, whereupon a positive bias through resistor R4 to the base of transistor T5 is established for it to conduct and to capacitor C6 and the collector of T7. Conduction to ground by transistor T5 through low resistance R5 maintains the blocking bias imposed on the base of transistor T6 to preserve this status until the positive bias on the base of transistor T5 is bled to ground through diode D3 and resistor R5 when the base of transistor T7 is pulsed as just described to render it conducting.

Transistor T7 upon termination of the timer pulse becomes non-conducting again when its base is negatively biased again through resistor R3. This restores the T5 and T6 to normal state by the base of transistor T5 being negatively biased by the current through diode D3 to become non-conducting and this in turn applies a positive potential upon the base of transistor T6 to render it conducting.

From the time that the base of transistor T6 is pulsed for non-conduction and the base of transistor T7 is pulsed by the timer to conduct, the potential on electrolytic capacitor C6 becomes and remains positive thereby providing a positive pulse of long duration on the other side of the capacitor C6 after which the capacitor C6 is returned to its original state.

The pulse response delivered by the capacitor C6 is a positive pulse of timed duration upon the base of the normally non-conducting transistors T8. But the collector of transistor T8*a* is connected to the base of a PNP transistor T9 and when transistor T8*a* conducts during the timed pulse of the base of transistor T9 is grounded and T9 conducts a positive current through its collector to one leg of a potentiometer 62, whereas the collector of the transistor T8*b* imposes a negative current potential on the other leg of the potentiometer when it conducts with is emitter connected to a −12 v. DC voltage tap. The movable contact 64 of the potentiometer is connected to ground through the meter 56 as filtered by a series resistor and parallel back-to-back electrolytic capacitors 66 provided to reduce pulse ripple. The potentiometer balances the output of the two circuits to the meter and two volume control resistors R4 (FIG. 2) adjust the relative input signals at transistor T3. Suitable switches (not shown) for shorting the bases of transistors alternately to ground may be provided if desired to "zero" the meter 56. The circuitry in the box diagrams may be conventional circuitry for the purposes stated.

The meter 56 employed in this invention is by way of example a shadow meter in which the hand 70, when it deviates a predetermined distance in either direction, blocks the passage of light through apertures 74 to photoelectric cells connected to suitable current amplifiers (not shown) for operating the reversing motor 34*m* (FIG. 1). The light preferably is a pulsing light that can be varied manually at 76 to enable a full range of web stretch adjustment control already discussed and particularly to provide the web stretch desired lag of correction to accommodate the relative distance between the scanner and the control. This circuitry for powering the motors 34*m* and 44*m* may be conventional as long as it can vary the direction and speed of the motors from the current controlled by the meter 56. Suitable speedometer means 72 (FIG. 1) is provided to remove the motors 14*m*, 34*m* and 44*m* from operation until the web is up to its working speed.

However, it is to be noted from the description that other factors can be controlled. Alternate relays can be controlled, or signals actuated, visual or auditory. It can be a temperature of a chill roll or coating such as wax or of a drier. The control of the speed of metering rollers is shown primarily, but one or more other factors may also be relied upon for stretch control depending on the nature of the preformed web employed and the speed at which it is processed.

From the description it will be observed how the various objects set forth are accomplished and how further embodiments of the invention may be provided without departing from the spirit of the invention, the scope of which is commensurate with the appended claims.

What is claimed is:

1. A control for the multiple processing of a continuous web on which repeat indica are applied at regular intervals comprising: spaced scanning devices actuated by said indicia as they move past the scanning devices, circuit means actuated by each of said scanning devices for providing pulsing currents of opposite polarity which are of durations related to the repeated actuation of the scanning devices and which terminate simultaneously, discriminating means receiving said currents and being responsive to the current pulses that are of greater duration, means for varying the stretch tension upon said web, and control means controlled by the discriminating means for controlling said stretch varying means in relation to the polarity of the current pulses of greater duration.

2. A control for the multiple processing of a continus web on which repeat indicia are applied at regular intervals comprising: scanning devices spaced a predetermined distance from each other actuated by pairs of said indicia as they move past the scanning devices to provide scan pulses, circuit means actuated separately by each of said scan pulses, timer means controlled by one of said circuit means when actuated by its scan pulse, said timer means increasing the length of said scan pulses to provide a timed pulse and rendering the timed pulses of both circuits overlapping and coterminous at one end of their duration for providing pulsing currents of opposite polarity and of durations related to the repeated actuation of the scan pulses, and discriminating means receiving said pulsing currents and being responsive to the current pulses that are of greater duration when there is a differential in their duration, means for varying the stretch tension upon said web, and control means controlled by the discriminating means for controlling said stretch varying means in relation to the polarity of the differential current provided by the timed current pulses of greater duration.

3. A control for the multiple processing of a continuous web in which repeat indicia are applied to the web at distances of predetermined spacing as a step in maintaining the stretch of the web constant comprising means for varying the stretch of said web, means for moving the web at a lineal speed to move said indicia sequentially in a predetermined path, two indicia responsive means spaced along said path at the distance of said predetermined spacing and responsive to pairs of indicia passing along said path to provide two independent electrical pulses, circuit means for each of said responsive means actuated by pulses of said responsive means upon response to an indicia to provide a pulsing current of predetermined polarity opposite to that for the other circuit means, a current flow polarity sensing meter, current conducting means for each circuit means conducting pulsing currents of opposite polarity to said meter through a common connection thereof, said circuit means separately controlling one of the terminals of each of its pulses, means for terminating simultaneously the other terminal of said pulses, means for cancelling said coterminal pulses to the extent they overlap, and means responsive to any differential present between the length of overlapping pulses for controlling said stretch varying means.

4. A control for the multiple processing of a continuous web on which repeat indicia are applied at regular intervals comprising: photoelectric scanning devices spaced at predetermined distance and actuated by said indicia in pairs as they move past the scanning devices, circuit means controlled by each of said scanning devices each including a pulse sharpening highpass filter and a timer controlled by the filtered pulse first produced by each pair of indicia, means for increasing the duration of said first pulse and simultaneously terminating both pulses, means for providing pulsing currents of predetermined polarity and durations related to any differential present between the coterminated pulses of increased duration during the repeated actuation of the scanning devices, and means responsive to the duration of said pulsing currents, means for varying the stretch tension upon said web, and control means controlled by the responsive means for controlling said stretch varying means in relation to the polarity of the currents of greater duration.

5. In combination with a machine for processing a continuous web of material on which repeat indicia are applied at regular intervals, said machine having a process step which results in a varying of the length of said web and the distance between said indicia, a control comprising spaced scanning devices actuated by said indicia in pairs as they move past the scanning devices following said process, web processing means disposed between said processing step and scanning devices for counteracting the effect upon the web of said process step, circuit means actuated by each of said scanning devices for providing pulsing currents of opposite polarity of pulse durations related to the repeated actuation of the scanning devices by each pair of indicia and being coterminus at one end of their duration, and means for receiving said currents responsive to the current pulses that are of greater duration caused by said variation in length of said web to provide a pulse current of the polarity of said pulse of greater duration, and control means controlled by said pulse current for controlling said web processing means in relation to the polarity of said pulse current to correct the web and the distance between said pairs of indicia to a predetermined distance related to the original distance thereof.

6. In combination with a machine for processing a continuous web of material on which repeat indicia are applied at predetermined distance intervals, said machine having a process step which results in a varying of the length of said web and this distance between said indicia, a control comprising: scanning devices located beyond said process step and spaced said predetermined distance from each other for actuation by pairs of said indicia as they move past the scanning devices to provide a pair of scan pulses, timer means controlled by the one of said circuit means actuated by the first of said pair of scan pulses for increasing the length of both of said pair of scan pulses to provide a timed pulse for each and render the timed pulses for both circuits overlapping, said timer simultaneously terminating the time pulses to provide a duration differential current between the time pulses, means disposed between said process step and said scanning devices operable upon the web for counteracting the length effect of said process step upon the web, and means responsive to said differential current and controlling said length counteracting means for correcting the length of said web.

7. A control for the multiple processing of a continuous web on which repeat indicia are applied at regular intervals comprising: spaced scanning devices actuated by said indicia as they move past the scanning devices, circuit means actuated by each of said scanning devices for providing pulsing currents of opposite polarity and simultaneous terminations having durations related to the repeated actuation of the scanning devices, meter means receiving said currents and being responsive to the current pulses that are of greater duration, metering rollers for varying the stretch upon said web, and reversible motor actuated means controlled by the meter means for varying the speed of the metering rollers with respect to web to control the stretch of the web in relation to the polarity of the currents of greater duration.

8. In combination with a machine for processing a continuous web of material on which repeat indicia are applied at regular intervals having a predetermined distance between them, said machine having a process step which results in varying of the length of said web, a control comprises: spaced photoelectric scanning devices actuated by said indicia in pairs as they move past the scanning devices following said process step to provide a pair of electrical pulses, web processing means disposed between said processing step and scanning devices for counteracting the effect upon the web of said process step, circuit means actuated by pulses of each of said scanning devices for providing pulsing currents of opposite polarity of pulse duration related to the repeated actuation of the scanning devices by each pair of indicia, each of said circuits including a high pass filter for sharpening said pulses, a self holding electronic relay actuated by said sharpened pulse, and one of said circuits having a polarity inversion output, a timer actuated by the first occurring of said sharpened pulses for releasing the relays of both circuits to simultaneously terminate the overlapping current pulses one of which is of greater duration than the other caused by said variation in the length of said web, means for cancelling the overlapping portions of the output current pulses of opposite polarity to leave a differential current pulse of a polarity related to the condition of the web, and control means controlled by differential pulse current for controlling said web processing means in relation to the polarity of said pulse current to correct the web and the distance between said pairs of indicia to a predetermined distance related to the distance between said pairs of indicia to a predetermined distance related to the distance between said scanning devices.

9. In combination with a machine for processing a continuous web of material on which repeat indicia are applied at predetermined distance intervals, said machine having a process step which results in a varying of the length of said web, a control comprising: photoelectric scanning devices located beyond said process step and spaced a predetermined distance from each other comparable to the spacing of said indicia in pairs for actuation by pairs of said indicia as they move past the scanning devices to provide a pair of scan pulses, a pair of circuit means actuated separately by respective ones of said scan pulses including timer means controlled by the one of said circuit means actuated by the first occurring pulse of said pair of scan pulses, said timer means increasing the length of both of said pair of scan pulses to provide a timed pulse for each circuit and render the timed pulses for both circuits overlapping, said timer simultaneously terminating the time pulses to provide a pulse duration differential current between the time pulses, means disposed between said process step and said scanning devices operable upon the web to counteract the length effect of said process step upon the web, metering roller means for controlling said length counteracting means for correcting the length of said web and reversible motor means for controlling said metering roller means.

10. The combination called for in claim 9 in which said process step and said counteracting means include a humidity adding device and a drying device.

References Cited

UNITED STATES PATENTS

| | | |
|---|---|---|
| 2,332,573 | 10/1943 | Hibschman et al. |
| 2,521,691 | 9/1950 | Corlett. |
| 2,583,580 | 1/1952 | Ludwig. |
| 2,840,370 | 6/1958 | Noble |
| 2,840,371 | 6/1958 | Frommer. |
| 2,994,783 | 8/1961 | Looschen. |
| 3,222,501 | 12/1965 | Wood. |

RALPH G. NILSON, *Primary Examiner.*

M. A. LEAVITT, *Assistant Examiner.*

U.S. Cl. X.R.

250—214; 88—14